US012712451B2

(12) United States Patent
Park

(10) Patent No.: US 12,712,451 B2
(45) Date of Patent: Aug. 18, 2026

(54) POWER CONVERSION APPARATUS AND METHOD, COMPUTER READABLE STORAGE MEDIUM STORING PROGRAM FOR PERFORMING THE METHOD

(71) Applicant: HL MANDO CORPORATION, Gyeonggi-do (KR)

(72) Inventor: Hyeonwoo Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 232 days.

(21) Appl. No.: 18/619,224

(22) Filed: Mar. 28, 2024

(65) Prior Publication Data

US 2024/0396449 A1 Nov. 28, 2024

(30) Foreign Application Priority Data

May 25, 2023 (KR) ........................ 10-2023-0067441

(51) Int. Cl.
*H02M 3/15* (2006.01)
*H02M 1/00* (2006.01)
*H02M 3/156* (2006.01)

(52) U.S. Cl.
CPC ......... *H02M 3/156* (2013.01); *H02M 1/0054* (2021.05)

(58) Field of Classification Search
CPC .................................................... H02M 1/0054
See application file for complete search history.

(56) References Cited

U.S. PATENT DOCUMENTS

2017/0346416 A1* 11/2017 Rutgers ................... H02M 7/06
2022/0037980 A1* 2/2022 Young ..................... H02M 7/08
2024/0359567 A1* 10/2024 Bunnell ................ B60L 15/007

FOREIGN PATENT DOCUMENTS

JP 2011-138736 7/2011
JP 2023-7893 1/2023
(Continued)

OTHER PUBLICATIONS

Office Action dated Oct. 7, 2024 for Korean Patent Application No. 10-2023-0067441 and its English translation from Global Dossier.
(Continued)

*Primary Examiner* — Zahid Choudhury

(74) *Attorney, Agent, or Firm* — WOMBLE BOND DICKINSON (US) LLP

(57) ABSTRACT

A power conversion apparatus and method, and a non-transitory computer readable storage medium storing a program for performing the method are disclosed. The power conversion apparatus capable of converting and providing power from a first power source to a second power source may include a plurality of power conversion modules connected in parallel with each other between the first power source and the second power source and respectively responsible for converting power input from the first power source; and a controller configured to control the plurality of power conversion modules. The controller may selectively drive at least one of the plurality of power conversion modules depending on a ratio of input power input from the first power source to maximum available input power capable of being input from the first power source. The controller may preferentially drive a power conversion module having a lowest accumulated driving time among the plurality of power conversion modules if only one or some of the plurality of power conversion modules is driven.

17 Claims, 4 Drawing Sheets

(56) References Cited

FOREIGN PATENT DOCUMENTS

| | | |
|---|---|---|
| KR | 10-2005-0089832 | 9/2005 |
| KR | 10-2016-0014280 | 2/2016 |
| KR | 10-2017-0030856 | 3/2017 |

OTHER PUBLICATIONS

Notice of Allowance dated May 12, 2025 for Korean Patent Application No. 10-2023-0067441 and its English translation provided by Applicant's foreign counsel.

* cited by examiner

FIG. 4

| ID | accumulated driving time (sec) |
|---|---|
| 1 | 1900 |
| 2 | 1700 |
| 3 | 1500 |

FIG. 5

| ID | accumulated driving time (sec) |
|---|---|
| 1 | 1700 |
| 2 | 1900 |
| 3 | 1700 |

POWER CONVERSION APPARATUS AND METHOD, COMPUTER READABLE STORAGE MEDIUM STORING PROGRAM FOR PERFORMING THE METHOD

CROSS-REFERENCE TO RELATED APPLICATION

This application claims priority to and the benefit of Korean Patent Application No. 10-2023-0067441, filed on May 25, 2023, the disclosures of which is incorporated herein by reference in its entirety.

FIELD

The present disclosure generally relates to a power conversion apparatus and method, and a computer readable storage medium storing a program or instructions for performing the method, and more particularly, to a power conversion apparatus and method for converting and providing power from a first power source to a second power source, and a non-transitory computer readable storage medium storing a program or instructions for performing the method.

BACKGROUND

A power conversion apparatus may be a device that converts some power into another power, such as current or voltage. In general, the power conversion apparatus includes a plurality of converter modules, each including one or more semiconductor switches.

The loss of the semiconductor switch, which is a major component of the power conversion apparatus, can be largely divided into a conduction loss due to resistance according to the flow of current in a conductor and a switching loss due to the operation of the semiconductor switch. The loss appears as heat, and the greater the loss of the power conversion apparatus, the greater the calorific value.

When the power conversion apparatus is driven, a difference in efficiency occurs depending on the load. In general, the power conversion apparatus is designed to achieve maximum efficiency in a rated load and maximum load range. But recently, it is required to achieve high efficiency over the entire load range from a low load range to a maximum load range.

In this regard, in the case of an interleaved power conversion apparatus in which a plurality of converter modules are all driven, efficiency may be deteriorated due to the conduction loss and the switching loss in the low load range. In order to solve this problem, a method of selectively driving some converter modules among a plurality of converter modules if the load is low, such as a Phase-shedding technique, may be used.

The conventional Phase-shedding technique is performed in a state in which a driving priority is assigned to each of the plurality of converter modules. As a result, a specific converter module is always driven from the low load range to the maximum load range, which may cause an imbalance in driving time for each converter module and a reduction in the lifespan of the power conversion apparatus.

(Patent Document) Korean Patent Application Publication No, 2017-0030856 "power converter for DC-Dc conversion", published on Mar. 20, 2017.

SUMMARY

An object of the present disclosure may be to provide a power conversion apparatus and method, and a computer readable storage medium storing a program or instructions for performing the method which are capable of improving lifespan and long-term reliability by uniformly accumulating driving time for each power conversion module while minimizing switching loss by driving only one or some of a plurality of power conversion modules in a low load range.

Another object of the present disclosure may be to provide a power conversion apparatus and method, and a computer readable storage medium storing a program for performing the method which are capable of efficiently maintaining a load of a controller by cumulatively computing a driving time for each power conversion module and initializing the cumulatively computed driving time for each power conversion module under a predetermined condition.

The objects of the present disclosure are not limited to the above-described objects, and other objects that are not mentioned will be able to be clearly understood by those skilled in the art to which the present disclosure pertains from the following description.

According to an aspect of the present disclosure, there is provided a power conversion apparatus capable of converting and providing power from a first power source to a second power source, the power conversion apparatus including a plurality of power conversion modules connected in parallel with each other between the first power source and the second power source and respectively responsible for converting power input from the first power source, and a controller configured to control the plurality of power conversion modules, wherein the controller may drive at least a part of the plurality of power conversion modules depending on a ratio of input power input from the first power source to maximum input available power input from the first power source, and wherein the controller may preferentially drive a power conversion module having a minimum accumulated driving time among the plurality of power conversion modules if only a part of the plurality of power conversion modules is driven.

In the power conversion apparatus according to an aspect of the present disclosure, the controller may randomly select and drive a part of two or more power conversion modules having the minimum accumulated driving time if two or more power conversion modules having the minimum accumulated driving time exist and the number of power conversion modules having the minimum accumulated driving time is greater than the number of power conversion modules to be driven.

In the power conversion apparatus according to an embodiment of the present disclosure, the controller may select in order of higher or lower unique identification information and drive a part of two or more power conversion modules having the minimum accumulated driving time if two or more power conversion modules having the minimum accumulated driving time exist and the number of power conversion modules having the minimum accumulated driving time is greater than the number of power conversion modules to be driven.

In the power conversion apparatus according to an aspect of the present disclosure, the first power source may be a fuel cell, and the second power source may be a battery that can be charged by the fuel cell.

In the power conversion apparatus according to one embodiment of the present disclosure, the controller may receive a command regarding an output voltage and an output current of the first power source from a higher-level controller and compute the input power.

In the power conversion apparatus according to an aspect of the present disclosure, the plurality of power conversion modules may equally divide the maximum input available power and take charge of the divided power.

In the power conversion apparatus according to an aspect of the present disclosure, the number of power conversion modules is n (where n is a natural number greater than or equal to 2), and each of the power conversion modules may be responsible for converting 1/n of the maximum input available power.

In the power conversion apparatus according to an aspect of the present disclosure, the controller may cumulatively compute a driving time of each of power conversion modules.

In the power conversion apparatus according to an aspect of the present disclosure, the controller may initialize the cumulatively computed driving time for each of the plurality of power conversion modules if the driving time corresponds to a predetermined condition.

In the power conversion apparatus according to an aspect of the present disclosure, the predetermined condition may be a case in which the driving time for each of the power conversion modules all reaches a predetermined reference time.

In the power conversion apparatus according to an aspect of the present disclosure, the reference time may be predetermined in a range of 1000 to 3000 seconds.

In the power conversion apparatus according to an aspect of the present disclosure, the predetermined condition may be a case in which the driving time for each of the power conversion modules is all within a predetermined reference time range.

In the power conversion apparatus according to an aspect of the present disclosure, the reference time range may be predetermined in a range of 1000 to 3000 seconds.

According to another aspect of the present disclosure, there is provided a power conversion method for converting and providing power from a first power source to a second power source, the method including computing, with a controller, input power input from the first power source, determining, with the controller, the number of power conversion modules required to be driven among a plurality of power conversion modules connected in parallel with each other between the first power source and the second power source and respectively responsible for converting power based on a ratio of the input power to a maximum input available power that can be input from the first power source, and driving, with the controller, the determined number of power conversion modules among the plurality of power conversion modules, and preferentially driving a power conversion module having a minimum accumulated driving time among the plurality of power conversion modules if only a part of the plurality of power conversion modules is driven, thereby driving at least a part of the plurality of power conversion modules.

In the power conversion method according to another aspect of the present disclosure, in driving at least a part of the plurality of power conversion modules, the controller may randomly select and drive a part of two or more power conversion modules having the minimum accumulated driving time if two or more power conversion modules having the minimum accumulated driving time exist and the number of power conversion modules having the minimum accumulated driving time is greater than the number of power conversion modules to be driven.

In the power conversion method according to another aspect of the present disclosure, in driving at least a part of the plurality of power conversion modules, the controller may select in order of higher or lower unique identification information and drive a part of two or more power conversion modules having the minimum accumulated driving time if two or more power conversion modules having the minimum accumulated driving time exist and the number of power conversion modules having the minimum accumulated driving time is greater than the number of power conversion modules to be driven.

In the power conversion method according to another aspect of the present disclosure, in computing the input power, the controller may receive a command regarding an output voltage and an output current of the first power source from a higher-level controller and compute the input power.

In the power conversion method according to another aspect of the present disclosure, the plurality of power conversion modules may equally divide the maximum input power.

In the power conversion method according to another aspect of the present disclosure, the number of power conversion modules is n (where n is a natural number greater than or equal to 2), and each of the power conversion modules may be responsible for converting 1/n of the maximum input available power.

The power conversion method according to another aspect of the present disclosure may further include cumulatively computing, with the controller, the driving time of each of the plurality of power conversion modules.

The power conversion method according to another aspect of the present disclosure may further include determining, with the controller, whether a predetermined condition is satisfied, and initializing, with the controller, the cumulatively computed driving time for each of the power conversion modules if the predetermined condition is satisfied.

In the power conversion method according to another aspect of the present disclosure, the predetermined condition may be a case in which the driving time for each of the power conversion modules all reaches a predetermined reference time.

In the power conversion method according to another aspect of the present disclosure, the reference time may be predetermined in a range of 1000 to 3000 seconds.

In the power conversion method according to another aspect of the present disclosure, the predetermined condition may be a case in which the driving time for each of the power conversion modules is all within a predetermined reference time range.

In the power conversion method according to another aspect of the present disclosure, the reference time range may be predetermined in a range of 1000 to 3000 seconds.

According to still another aspect of the present disclosure, a non-transitory computer readable storage medium having stored thereon a program including at least one instruction for performing the power conversion method is provided.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 4 is a table for illustrating an example of accumulated driving times of a plurality of power conversion modules of a power conversion apparatus according to an embodiment of the present disclosure.

FIG. 5 is a table for illustrating another example of accumulated driving times of a plurality of power conversion modules of a power conversion apparatus according to an embodiment of the present disclosure.

DETAILED DESCRIPTION OF EXEMPLARY EMBODIMENTS

Figure 1:
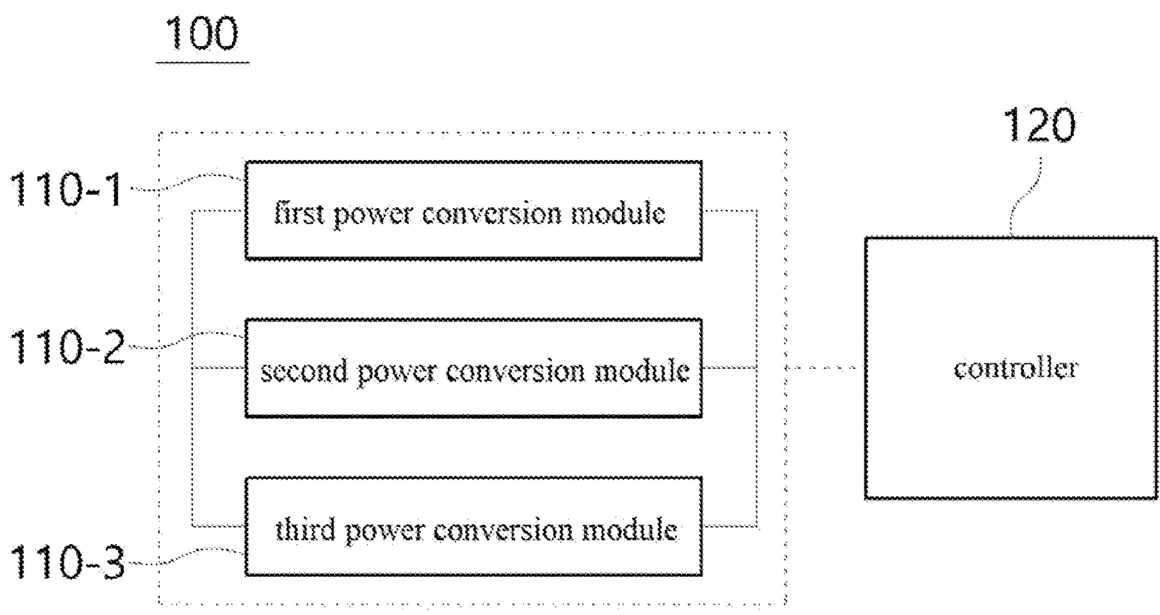
FIG. 1 is a block diagram for illustrating a configuration of a power conversion apparatus according to an embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limited construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

FIG. 1 is a block diagram for illustrating a configuration of an apparatus for power conversion according to an embodiment of the present disclosure.

The power conversion apparatus 100 according to an embodiment of the present disclosure may be configured to convert either one or both of current and voltage of input power, and output the converted current and voltage. For example, the power conversion apparatus 100 according to an embodiment of the present disclosure may be a DC-DC power conversion apparatus.

Referring to FIG. 1, the power conversion apparatus 100 according to an embodiment of the present disclosure may include a plurality of power conversion modules 110-1, 110-2, and 110-3, and a controller 120. In more detail, the plurality of power conversion modules in the power conversion apparatus 100 according to an embodiment of the present disclosure may include a first power conversion module 110-1, a second power conversion module 110-2, a third power conversion module 110-3, and a controller 120.

Figure 2:
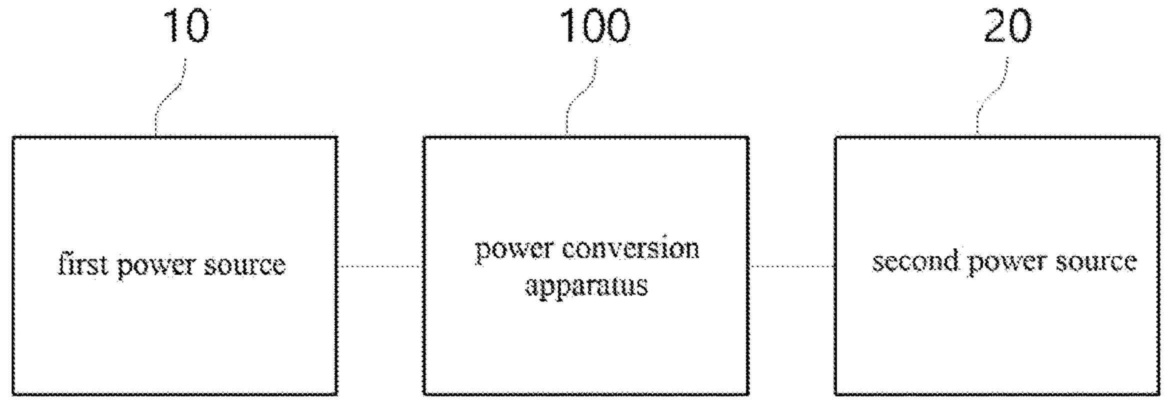
FIG. 2 is a block diagram for illustrating a power conversion system in which a power conversion apparatus according to an embodiment of the present disclosure is disposed.

FIG. 2 is a block diagram for illustrating a power conversion system in which a power conversion apparatus according to an embodiment of the present disclosure is used.

Referring to FIG. 2, the power conversion apparatus 100 according to an embodiment of the present disclosure may be configured to convert from power input from the first power source 10 to power output to the second power source 20 and provide the converted power. More specifically, the power conversion apparatus 100 may convert at least one of a voltage and a current input from the first power source 10 and provide the converted voltage and the current to the second power source 20.

For example, the first power source 10 may be a fuel cell, and the second power source 20 may be a battery, although not limited thereto. In this case, the second power source 20 may be charged by the first power source 10. In addition, the second power source 20 may have a battery pack type power source.

The power conversion apparatus 100 according to an embodiment of the present disclosure may be disposed and used in a fuel cell vehicle. In other words, the power conversion system shown in FIG. 2 may be installed to or disposed in a fuel cell vehicle. At this time, the first power source 10 may be a fuel cell disposed in a fuel cell vehicle. In addition, the second power source 20 may supply power to a motor. In this case, the motor may be disposed in the fuel cell vehicle to drive the vehicle.

Meanwhile, one or more inverters may be connected or disposed between the second power source 20 and the motor. The inverter may convert the power output from the second power source 20 to be suitable for driving the motor, and may supply the converted power to the motor.

Hereinafter, some exemplary embodiments of a configuration of the power conversion apparatus 100 according to an embodiment of the present disclosure will be described in detail.

The plurality of power conversion modules 110-1, 110-2, and 110-3 are connected in parallel with each other between the first power source 10 and the second power source 20. Each of the plurality of power conversion modules 110-1, 110-2, and 110-3 is configured to convert power input from the first power source 10.

Maximum input power that can be input from the first power source 10 may be defined as a maximum available input power. The plurality of power conversion modules 110-1, 110-2, and 110-3 may convert input power input from the first power source 10 within a range of the maximum available input power and provide the converted input power to the second power source 20.

The plurality of power conversion modules 110-1, 110-2, and 110-3 may equally divide the maximum available input power and take charge of the divided power. More specifically, the plurality of power conversion modules 110-1, 110-2, and 110-3 may equally divide the input power and take charge the divided power if the input power is equal to the maximum available input power. In other words, if the number of the power conversion modules is n (where n is a natural number greater than or equal to 2), each of the power conversion module may be configured to convert 1/n of the maximum available input power.

The power conversion modules of the power conversion apparatus 100 according to an embodiment of the present disclosure include a first power conversion module 110-1, a second power conversion module 110-2, and a third power conversion module 110-3, As such, if the number of the power conversion modules included in the power conversion apparatus 100 is 3, each of the power conversion modules may be configured to convert ⅓ of the maximum available input power.

That is, the first power conversion module 110-1 may be configured to convert ⅓ of the maximum available input power, the second power conversion module 110-2 may be configured to convert ⅓ of the maximum available input power, and the third power conversion module 110-3 may be configured to convert ⅓ of the maximum available input power. For example, if the maximum available input power is 100 kW, each of the first power conversion module 110-1, the second power conversion module 110-2, and the third power conversion module 110-3 may be configured to convert power of 33.33 kW.

The plurality of power conversion modules 110-1, 110-2, and 110-3 connected in parallel each other may constitute multi-phases. For example, the first power conversion module 110-1 may constitute a first phase, the second power conversion module 110-2 may constitute a second phase, and the third power conversion module 110-3 may constitute a third phase.

Figure 3:
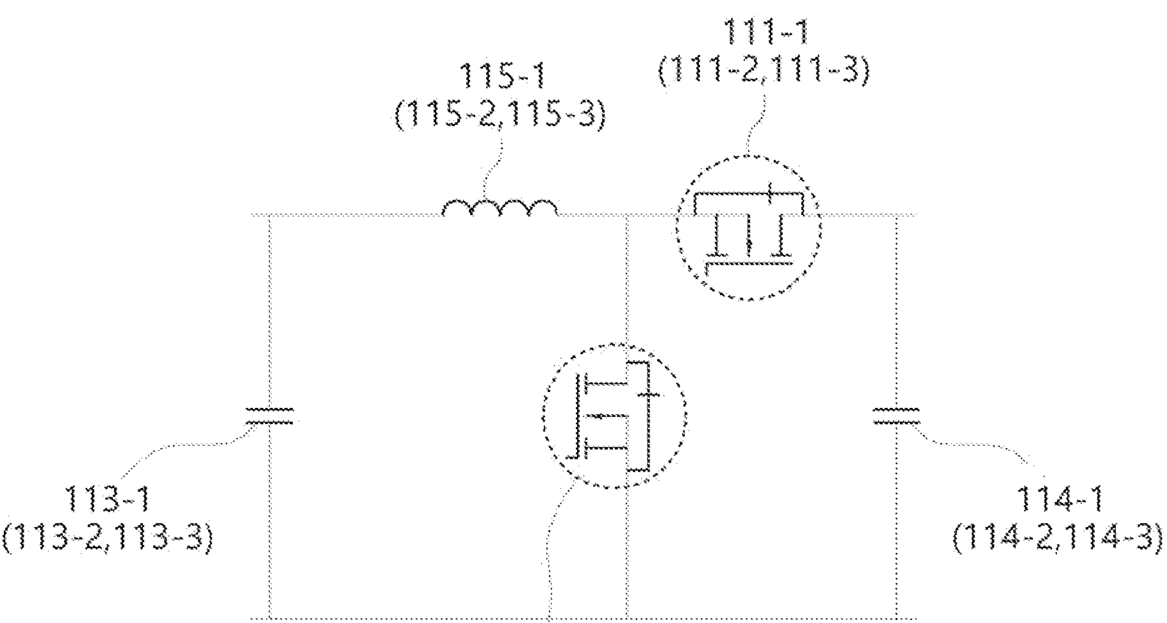
FIG. 3 is a circuit diagram for illustrating a configuration of a power conversion module of a power conversion apparatus according to an embodiment of the present disclosure.

FIG. 3 is a circuit diagram for illustrating a configuration of a power conversion module of a power conversion apparatus according to an embodiment of the present disclosure.

Referring to FIG. 3, the power conversion module 110-1, 110-2, or 110-3 may include a first voltage switch 111-1, 111-2, or 111-3, a second voltage switch 112-1, 112-2, or 112-3, a first capacitor 113-1, 113-2, or 113-3, a second capacitor 114-1, 114-2, or 114-3, and an inductor 115-1, 115-2, or 115-3.

The first voltage switch 111-1, 111-2, or 111-3 and the second voltage switch 112-1, 112-2, or 112-3 may be controlled to be turned on or off by the controller 120. For example, the first voltage may be higher than the second voltage, and the second voltage may be lower than the first voltage. Alternatively, the first voltage may be lower than the second voltage, and the second voltage may be higher than the first voltage.

If the first voltage switch 111-1, 111-2, or 111-3 is turned on, the second voltage switch 112-1, 112-2, or 112-3 may be turned off, and if the second voltage switch 112-1, 112-2, or 112-3 is turned on, the first voltage switch 111-1, 111-2, or 111-3 may be turned off. That is, both the first voltage switch 111-1, 111-2, or 111-3 and the second voltage switch 112-1, 112-2, or 112-3 may not be turned on at the same time.

The first capacitor 113-1, 113-2, or 113-3 and the second capacitor 114-1, 114-2, or 114-3 may be connected to the first power source 10 and the second power source 20. The first capacitor 113-1, 113-2, or 113-3 and the second capacitor 114-1, 114-2, or 114-3 may perform smoothing and power factor improvement.

The inductor 115-1, 115-2, or 115-3 induces a voltage in proportion to the amount of change in a current. The current generated in the inductor 115-1, 115-2, or 115-3 may be transmitted to the controller 120 as feedback information related to the control of the first voltage switch 111-1, 111-2, or 111-3 or the second voltage switch 112-1, 112-2, or 112-3.

The controller 120 controls the plurality of power conversion modules 110-1, 110-2, and 110-3. The controller 120 drives at least one or some of the plurality of power conversion modules 110-1, 110-2, and 110-3 depending on a ratio of input power input from the first power source 10 to the maximum available input power. In this case, the input power may be defined as power input from the first power source 10 with the plurality of power conversion modules 110-1, 110-2, and 110-3.

The controller 120 may receive commands regarding an output voltage and/or an output current of the first power source 10 from another controller such as a higher-level controller to compute the input power. More specifically, the product of the output voltage and the output current of the first power source 10 may be the input power. Alternatively, the controller 120 may determine the input power based on a predetermined criterion, real-time monitoring data, and the like by itself without receiving the other controller's command regarding an output voltage and/or an output current of the first power source 10.

The controller 120 may determine the number of the power conversion modules required to be driven among the plurality of power conversion modules 110-1, 110-2, and 110-3 depending on the ratio of the input power to the maximum input power. The controller 120 may determine the number of power conversion modules required to be driven to one or more, depending on the ratio of the input power to the maximum input power.

In an exemplary embodiment of the present disclosure, when the controller 120 performs the operation of determining the number of power conversion modules required to be driven, it is assumed that the maximum available input power is divided by three to be equally distributed to the first power conversion module 110-1, the second power conversion module 110-2, and the third power conversion module 110-3, and the first power conversion module 110-1, the second power conversion module 110-2, and the third power conversion module 110-3 constitute a first phase, a second phase, and a third phase, respectively.

At this exemplary embodiment, if the input power is less than or equal to ⅓ of the maximum available input power, the controller 120 may determine the number of power conversion modules required to be driven among the first power conversion module 110-1, the second power conversion module 110-2, and the third power conversion module 110-3 as one. In other words, the controller 120 may determine that one of the first power conversion module 110-1, the second power conversion module 110-2, and the third power conversion module 110-3 is required to be driven if the input power is less than or equal to about ⅓ of the maximum available input power.

Further, if the input power is more than one third and less than or equal to two third of the maximum available input available power, the controller 120 may determine the number of power conversion modules required to be driven among the first power conversion module 110-1, the second power conversion module 110-2, and the third power conversion module 110-3 as two. In other words, the controller 120 may determine that two of the first power conversion module 110-1, the second power conversion module 110-2, and the third power conversion module 110-3 is required to be driven if the input power is between about ⅓ and ⅔ of the maximum available input power.

Meanwhile, if the input power is more than ⅔ of the maximum available input power, the controller 120 may determine the number of power conversion modules required to be driven among the first power conversion modules 110-1, the second power conversion module 110-2, and the third power conversion module 110-3 as three. In other words, the controller 120 may determine that three of the first power conversion module 110-1, the second power conversion module 110-2, and the third power conversion module 110-3 is required to be driven if the input power is more than about ⅔ of the maximum available input power.

If only one or some of the plurality of power conversion modules 110-1, 110-2, and 110-3 are driven, the controller 120 may preferentially drive a power conversion module having a lowest accumulated driving time among the plurality of power conversion modules 110-1, 110-2, and 110-3.

If one or some power conversion modules are determined to be preferentially driven among the plurality of power conversion modules 110-1, 110-2, 110-3, the one or some power conversion modules determined to be preferentially driven are driven continuously from a low load region where the input power is relatively small compared to the maximum available input power to a maximum load region where the input power is the same as or substantially similar to the maximum input power. Accordingly, the lifespan of the preferentially driven power conversion module is consumed relatively quickly. Since the plurality of power conversion modules generally need to be replaced at the same time because individual replacement of the plurality of power conversion modules may be unavailable, this may result in the shortening of the life of the power conversion apparatus.

To avoid this problem, if only one or some of the plurality of power conversion modules 110-1, 110-2, and 110-3 are driven, the controller 120 preferentially drives a power conversion module having a minimum accumulated driving time (a power conversion module which has been least driven) among the plurality of power conversion modules 110-1, 110-2, and 110-3. Accordingly, the driving time of the plurality of power conversion modules 110-1, 110-2, and 110-3 may be uniformly accumulated or distributed. As a result, the lifespan of the power conversion apparatus may be extended and long-term reliability may be improved.

FIG. 4 is a table for illustrating an example of accumulated driving times of a plurality of power conversion modules of a power conversion apparatus according to an embodiment of the present disclosure.

Referring to FIG. 4, each of the first power conversion module 110-1, the second power conversion module 110-2, and the third power conversion module 110-3 may have unique identification information or identifier (ID). More specifically, in the exemplary embodiment of FIG. 4, the unique identification information or identifier (ID) of the first power conversion module 110-1 is set to "I", the unique identification information or identifier (ID) of the second power conversion module 110-2 is set to "2", and the unique identification information or identifier (ID) of the third power conversion module 110-3 is set to "3".

In addition, in the example shown in FIG. 4, the accumulated driving time of the first power conversion module 110-1 having the unique identification information or identifier (ID) "1" is 1900 seconds, the accumulated driving time of the second power conversion module 110-2 having the unique identification information or identifier (ID) "2" is 1700 seconds, and the accumulated driving time of the third power conversion module 110-3 having the unique identification information or identifier (ID) "3" is 1500 seconds.

As described above, the exemplary embodiment of FIG. 4 is performed under assumption that the driving time of the first power conversion module 110-1, the second power conversion module 110-2, and the third power conversion module 110-3 may be accumulated, the maximum available input power is divided by three to be equally distributed to each of the first power conversion module 110-1, the second power conversion module 110-2, and the third power conversion module 110-3, and the input power is one third of the maximum input power.

In this exemplary embodiment, the controller 120 may determine the number of power conversion modules required to be driven among a total of three power conversion modules to be one. Also, controller 120 may drive one of the first power conversion module 110-1, the second power conversion module 110-2, and the third power conversion module 110-3. The controller 120 may preferentially drive the power conversion module having the lowest accumulated driving time.

In the above example, the third power conversion module 110-3 having the unique identification information or identifier (ID) "3" has the smallest accumulated driving time compared to the other power conversion modules such as the first power conversion module 110-1 having the unique identification information or identifier (ID) "1" and the second power conversion module 110-2 having the unique identification information or identifier (ID) "2". That is, the third power conversion module 110-3 has a lowest accumulated driving time.

In consideration of this, the controller 120 may drive the third power conversion module 110-3 among the first power conversion module 110-1, the second power conversion module 110-2, and the third power conversion module 110-3. In other words, if the first power conversion module 110-1, the second power conversion module 110-2, and the third power conversion module 110-3 constitute the first phase, the second phase, and the third phase, respectively, the controller 120 may drive only the third phase associated with the third power conversion module 110-3 among the first phase, the second phase, and the third phase.

FIG. 5 is a table for illustrating another example of accumulated driving times of a plurality of power conversion modules of a power conversion apparatus according to an embodiment of the present disclosure.

Referring to FIG. 5, each of the first power conversion module 110-1, the second power conversion module 110-2, and the third power conversion module 110-3 may have unique identification information or identifier (ID). Specifically, in the exemplary embodiment of FIG. 5, the unique identification information or identifier (ID) of the first power conversion module 110-1 is set to "1", the unique identification information or identifier (ID) of the second power conversion module 110-2 is set to "2", and the unique identification information or identifier (ID) of the third power conversion module 110-3 is set to "3".

In addition, in the example shown in FIG. 5, the accumulated driving time of the first power conversion module 110-1 having the unique identification information or identifier (ID) "1" is 1700 seconds, the accumulated driving time of the second power conversion module 110-2 having the unique identification information or identifier (ID) "2" is 1900 seconds, and the accumulated driving time of the third power conversion module 110-3 having the unique identification information or identifier (ID) "3" is 1700 seconds.

As described above, the exemplary embodiment of FIG. 5 is performed under assumption that the driving time of the first power conversion module 110-1, the second power conversion module 110-2, and the third power conversion module 110-3 may be accumulated, the maximum available input power is divided by three to be equally distributed to each of the first power conversion module 110-1, the second power conversion module 110-2, and the third power conversion module 110-3, and the input power is one third of the maximum input power, is considered.

In this case, the controller 120 may determine the number of power conversion modules required to be driven among a total of three power conversion modules to be one, and preferentially drive the power conversion module having the lowest accumulated driving time.

However, in the example shown in FIG. 5, the second power conversion module 110-2 having the unique identification information or identifier (ID) "2" has the largest accumulated driving time of 1900 seconds, and the first power conversion module 110-1 having the unique identification information or identifier (I)) "1" and the third power conversion module 110-3 having the unique identification information or identifier (ID) "3" have the same accumulated driving time of 1700 seconds. In other words, there are two or more power conversion modules having the lowest accumulated driving time, and the number of power conversion modules having the lowest accumulated driving time is greater than the number of power conversion modules to be driven.

In this situation, the controller 120 may select a power conversion module to be driven from among the plurality of power conversion modules having the lowest accumulated driving time according to a predetermined criterion.

If two or more power conversion modules have the lowest accumulated driving time and the number of the power conversion modules having the lowest accumulated driving time is greater than the number of the power conversion modules to be driven, some examples of criteria for selecting a power conversion module to be driven by the controller 120 are described.

First, the controller may select in a random way and drive one or some of the plurality of power conversion modules having the lowest accumulated driving time if the plurality of power conversion modules have the lowest accumulated driving time and the number of the plurality of power conversion modules having the lowest accumulated driving time is greater than the number of power conversion modules required to be driven.

In the example shown in FIG. 5, the controller 120 may randomly select and drive one of the first power conversion module 110-1 and the third power conversion module 110-3 having the lowest accumulated driving time. In other words, if the first power conversion module 110-1, the second power conversion module 110-2, and the third power conversion module 110-3 constitute the first phase, the second phase, and the third phase, respectively, the controller 120 may drive a phase associated with one randomly selected power conversion module among the first phase and the third phase.

Next, the controller 120 may select one or some among the plurality of power conversion modules having the lowest accumulated driving time based on the order or number of higher or lower unique identification information or identifier assigned to each power conversion module and drive the selected one or some power conversion modules if two or more power conversion modules have the lowest accumulated driving time and the number of power conversion modules having the lowest accumulated driving time is greater than the number of power conversion modules required to be driven.

If the controller 120 selects and drives the power conversion module in the order of higher unique identification information or identifier, the controller 120 may select and drive the third power conversion module 110-3 having relatively high unique identification information or identifier (ID) among the first power conversion module 110-1 having unique identification information or identifier (ID) "1" and the third power conversion module 110-3 having unique identification information or identifier (ID) "3" in the exemplary embodiment shown in FIG. 5. That is, if the first power conversion module 1110-1, the second power conversion module 110-2, and the third power conversion module 110-3 constitute the first phase, the second phase, and the third phase, respectively, the controller 120 may drive the third phase associated with the selected third power conversion module 110-3.

If the controller 120 selects and drives one or some power conversion modules based on the order or number of lower unique identification information or identifier, the controller 120 may drive the first power conversion module 110-1 having relatively low or lowest unique identification information or identifier (ID) among the first power conversion module 110-1 having unique identification information or identifier (ID) "1" and the third power conversion module 110-3 having unique identification information or identifier (ID) "3" in the exemplary embodiment shown in FIG. 5. In other words, if the first power conversion module 110-1, the second power conversion module 110-2, and the third power conversion module 110-3 constitute the first phase, the second phase, and the third phase, respectively, the controller 120 may drive the first phase associated with the selected first power conversion module 110-1.

As described above, if the controller 120 preferentially drives the power conversion module having the lowest accumulated driving time among the plurality of power conversion modules 110-1, 110-2, and 110-3, the difference between a driving time of a power conversion module having the largest accumulated driving time and driving times of other power conversion modules may be can be reduced. In addition, driving times of the plurality of power conversion modules 110-1, 110-2, and 110-3 may be uniformly accumulated. As a result, the lifespan and long-term reliability of the power conversion apparatus 100 may be improved.

The controller 120 may cumulatively compute the driving times of each of the plurality of power conversion modules 110-1, 110-2, and 110-3. The controller 120 may compute driving times whenever at least one of the plurality of power conversion modules 110-1, 110-2, and 110-3 is driven, and may accumulate and store the computed driving time. For example, the controller 120 may generate and manage a database of accumulated driving time for each of the plurality of power conversion modules 110-1, 110-2, and 110-3. Examples of the database of the accumulated driving times for the plurality of power conversion modules 110-1, 110-2, and 110-3 are shown in FIGS. 4 and 5.

If the controller 120 determines that one or more predetermined conditions are satisfied, the controller 120 may initialize the cumulatively computed driving times of the power conversion modules. If the controller 120 continuously accumulates the driving times of the power conversion modules 110-1, 110-2, and 110-3, the amount of data increases, and the efficiency of resource use of the controller 120 may decrease. However, such a problem may be resolved or prevented if the controller 120 can initialize the cumulatively computed driving times for the power conversion modules when one or more predetermined conditions are satisfied.

In an exemplary embodiment of the present disclosure, one or more predetermined conditions for resetting or initializing the accumulated driving times of the power conversion modules may include a condition of whether the accumulated driving times for all of the power conversion modules reach a predetermined reference time. For example, the reference time may be preset to a range of 1000 to 3000 seconds. The range of 1000 to 3000 seconds can balance the efficiency of data storage usage and the accuracy of the control of the power conversion modules 110-1, 110-2, and

110-3. Preferably, the reference time may be preset to be a specific value such as 2000 seconds.

For example, if the reference time is preset to 2000 seconds and the accumulated driving times of all of the first power conversion module 110-1, the second power conversion module 110-2, and the third power conversion module 110-3 reach or become over 2000 seconds, the controller 120 may initialize all of the accumulated driving times of the first power conversion module 110-1, the second power conversion module 110-2, and the third power conversion module 110-3 to a preset initialization number such as zero.

In addition, in an exemplary embodiment of the present disclosure, one or more predetermined conditions for resetting or initializing the accumulated driving times of the power conversion modules may comprise a condition of whether the accumulated driving times for all of the power conversion modules are within a predetermined reference time range. For example, the reference time range may be preset to a range of 1000 to 3000 seconds.

For instance, when the reference time range is preset to a range of 1900 to 2100 seconds, if the accumulated driving times of the first power conversion module 110-1, the second power conversion module 110-2, and the third power conversion module 110-3 reaches 1950 seconds, 2000 seconds, and 2030 seconds, respectively, the controller 120 may initialize all of the accumulated driving times of the first power conversion module 110-1, the second power conversion module 110-2, and the third power conversion module 110-3 to a preset initialization number such as zero.

Meanwhile, after the accumulated driving times of the first power conversion module 110-1, the second power conversion module 110-2, and the third power conversion module 110-3 are all initialized to zero (0), the controller 120 may start to compute and accumulate driving times of the first power conversion module 110-1, the second power conversion module 110-2, and the third power conversion module 110-3 from a preset initialization number, for example, but not limited to, zero (0) second, respectively.

The controller 120 may include one or more processors for computation and process of data. The processor may include, for instance, but not limited to, one or more integrated circuit (IC) chips. In addition, the controller 120 may include a storage medium for data storage. For example, the storage medium may be a random access memory (RAM), a flash memory, or the like. In addition, the controller 120 may include a circuit board on which one or more processors, storage media, one or electronic components and the like are mounted or connected.

Figure 6:
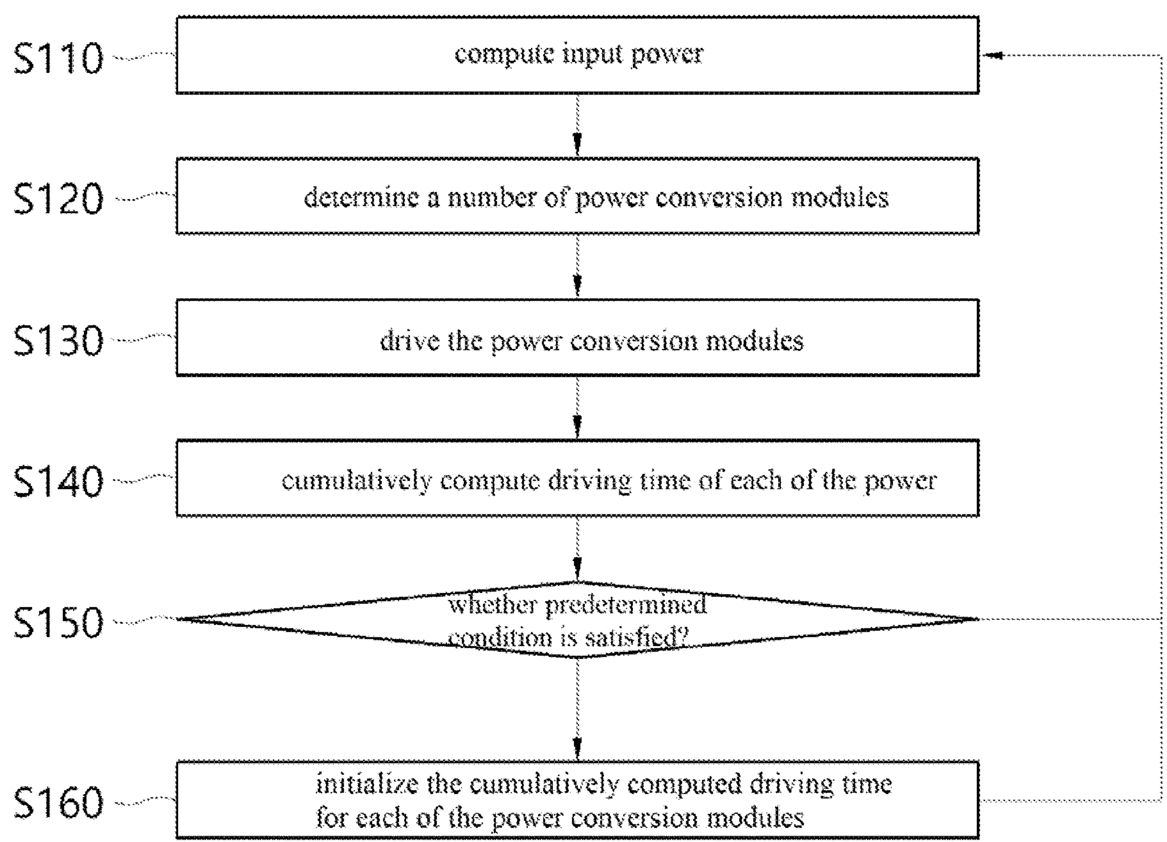
FIG. 6 is a flowchart of a power conversion method according to an embodiment of the present disclosure.

FIG. 6 is a flowchart of a power conversion method according to an embodiment of the present disclosure.

The power conversion method according to an embodiment of the present disclosure is to convert and provide one or more of a current and a voltage of input power. The power conversion method according to an embodiment of the present disclosure is to convert power input from the first power source 10 and provide the converted power to the second power source 20. The power conversion method according to an embodiment of the present disclosure may be performed by the power conversion apparatus 100 according to an embodiment of the present disclosure. For example, the power conversion method according to an embodiment of the present disclosure may be performed for DC-DC power conversion.

Referring to FIG. 6, a power conversion method according to an embodiment of the present disclosure may be performed as follows.

First, the controller 120 computes input power input from the first power source 10 (Step 110).

The input power may be defined as power input from the first power source 10 to a plurality of power conversion modules 110-1, 110-2, and 110-3 connected in parallel with each other between the first power source 10 and the second power source 20.

The controller 120 may receive commands regarding, or associated with, an output voltage and an output current of the first power source 10 from another controller, for example, but not limited to, a higher-level controller, to compute the input power. In more detail, the output voltage and the output current of the first power source 10 may be input power input to the plurality of power conversion modules 110-1, 110-2, and 110-3. Alternatively, the controller 120 may determine the input power based on a predetermined criterion, real-time monitoring data, and the like.

Meanwhile, the input power may be determined to be less than or equal to a maximum available input power that can be input from the first power source 10. In an exemplary embodiment of the present disclosure, the maximum available input power may be a maximum available input power input from the first power source 10.

Next, the controller 120 determines the number of power conversion modules 110-1, 110-2, 110-3 required to be driven based on a ratio of the input power to the maximum available input power that can be input from the first power source 10 (Step 120).

The controller 120 determines how many power conversion modules among the plurality of power conversion modules 110-1, 110-2, and 110-3 require or need to be driven by comprehensively considering the maximum input available power, the input power, a ratio of each the power conversion module, and so on.

As described above, the plurality of power conversion modules 110-1, 110-2, and 110-3 are connected in parallel with each other between the first power source 10 and the second power source 20 and each take charge of a part of the maximum input power that can be converted from the first power source 10 to the second power source 20 and provided. Also, the plurality of power conversion modules 110-1, 110-2, and 110-3 may equally divide the maximum available input power and take charge of the power conversion modules.

For example, the first power conversion module 110-1, the second power conversion module 110-2, and the third power conversion module 110-3 may be connected in parallel with each other between the first power source 10 and the second power source 20, and each of the power conversion modules may be responsible for converting one third of the maximum available input power. As a more specific example, if the maximum available input power is 100 kW, the first power conversion module 110-1, the second power conversion module 110-2, and the third power conversion module 110-3 may be responsible for converting power of 33.33 kW, respectively.

Also, a plurality of power conversion modules 110-1, 110-2, and 110-3 connected to each other in parallel may constitute multi-phases. For example, the first power conversion module 110-1 may constitute a first phase, the second power conversion module 110-2 may constitute a second phase, and the third power conversion module 110-3 may constitute a third phase.

Hereinafter, it is assumed that the first power conversion module 110-1, the second power conversion module 110-2, and the third power conversion module 110-3 may be equally divided by one third of the maximum available input power, and constitute a first phase, a second phase, and a third phase, respectively.

At this time, if the input power is less than or equal to one third of the maximum available input power, the controller 120 may determine that the number of power conversion modules required to be driven among the first power conversion module 110-1, the second power conversion module 110-2, and the third power conversion module 110-3 is one.

Meanwhile, if the input power is more than one third and less than or equal to two third of the maximum available input power, the controller 120 may determine that the number of power conversion modules required to be driven among the first power conversion module 110-1, the second power conversion module 110-2, and the third power conversion module 110-3 is two.

In addition, if the input power is more than two third of the maximum available input power, the controller 120 may determine that the number of power conversion modules required to be driven among the first power conversion modules 110-1, the second power conversion module 110-2, and the third power conversion module 110-3 are three.

Next, the controller 120 drives one or more of power conversion modules 110-1, 110-2, 110-3 corresponding to the number of power conversion modules determined to be required to be driven at Step 120 (Step 130), In this case, if only one or some of the plurality of power conversion modules 110-1, 110-2, and 110-3 are driven, the controller 120 may preferentially drive a power conversion module having a lowest accumulated driving time among the plurality of power conversion modules 110-1, 110-2, and 110-3.

As shown in FIG. 4, if the first power conversion module 110-1, the second power conversion module 110-2, and the third power conversion module 110-3 have cumulative driving times of 1900 seconds, 1700 seconds, and 1500 seconds, respectively, and the number of the power conversion modules 110-1, 110-2, and 110-3 required to be driven among the plurality of power conversion modules 110-1, 110-2, and 110-3 is determined to be one, the controller 120 drives the third power conversion module 110-3 having the lowest cumulative driving time.

In other words, if the first power conversion module 110-1, the second power conversion module 110-2, and the third power conversion module 110-3 constitute the first phase, the second phase, and the third phase, respectively, the controller 120 may drive only the third phase associated with the third power conversion module 110-3 among the first phase, the second phase, and the third phase.

Meanwhile, if multiple power conversion modules have the lowest accumulated driving time and the number of the power conversion modules having the lowest accumulated driving time is greater than the number of power conversion modules required to be driven, the controller 120 may select one or more power conversion modules to be driven according to one or more predetermined criteria.

For example, the controller 120 may randomly select and drive one or some of the plurality of power conversion modules having the lowest accumulated driving time, if the plurality of power conversion modules have the lowest accumulated driving time and the number of power conversion modules having the lowest accumulated driving time is greater than the number of power conversion modules required to be driven.

Further, the controller 120 may select one or some among the plurality of power conversion modules having the lowest accumulated driving time based on the order or number of higher or lower unique identification information or identifier assigned to each power conversion module and drive the selected one or some power conversion modules if two or more power conversion modules have the lowest accumulated driving time and the number of power conversion modules having the lowest accumulated driving time is greater than the number of power conversion modules required to be driven.

In the example shown in FIG. 5, the accumulated driving time of the first power conversion module 110-1 having the unique identification information or identifier (ID) “1” is 1700 seconds, the accumulated driving time of the second power conversion module 110-2 having the unique identification information or identifier (ID) “2” is 1900 seconds, the accumulated driving time of the third power conversion module 110-3 having the unique identification information or identifier (ID) “3” is 1700 seconds, and the number of power conversion modules 110-1, 110-2, and 110-3 required to be driven is determined to be one (1).

In an example, the controller 120 may randomly select and drive one power conversion module among the first power conversion module 110-1 and the third power conversion module 110-3 having the lowest accumulated driving time. In another example, the controller 120 may select the third power conversion module 110-3 based on the order of higher unique identification number and drive the third power conversion module 110-3. Alternatively, the controller 120 may select the first power conversion module 110-1 in the order of lower unique identification number and drive the first power conversion module 110-1.

As described above, if the controller 120 preferentially drives a power conversion module having the lowest accumulated driving time among the plurality of power conversion modules 110-1, 110-2, and 110-3, the difference between a driving time of a power conversion module having the largest accumulated driving time and driving times of other power conversion modules can be reduced. In addition, driving times of the plurality of power conversion modules 110-1, 110-2, and 110-3 may be uniformly accumulated. As a result, the lifespan and long-term reliability of the power conversion apparatus 100 may be improved.

Next, the controller 120 cumulatively computes the driving times of each of the plurality of power conversion modules 110-1, 110-2, and 110-3 (Step 140).

The controller 120 may measure a driving time whenever each of the plurality of power conversion modules 110-1, 110-2, and 110-3 is driven, and accumulate the measured driving times in an existing driving time to cumulatively manage the driving time for each power conversion module. For example, the controller 120 may generate and manage a database of accumulated driving times for each of the plurality of power conversion modules 110-1, 110-2, and 110-3. Examples of the database of the accumulated driving times for the plurality of power conversion modules 110-1, 110-2, and 110-3 are shown in FIGS. 4 and 5.

Next, the controller 120 determines whether one or more predetermined conditions are satisfied (Step 150).

One or more predetermined conditions are preset to initialize the stored cumulatively computed driving time for each of the power conversion modules. The controller 120 determines or identifies whether one or more predetermined conditions are satisfied in order to determine whether to perform initialization of the stored cumulatively computed driving time for each of the power conversion modules.

In an exemplary embodiment of the present disclosure, one or more predetermined conditions resetting or initializing the accumulated driving times of the power conversion modules may include a condition of whether the accumulated driving times for all of the power conversion modules reach a predetermined reference time. For example, the reference time may be preset to a range of 1000 to 3000 seconds. Alternatively, the reference time may be preset to a specific number such as 2000 seconds.

For example, if the reference time is preset to 2000 seconds and the accumulated driving times of all of the first power conversion module 110-1, the second power conversion module 110-2, and the third power conversion module 110-3 reach or become over 2000 seconds, the controller 120 may determine that the predetermined condition is satisfied.

In addition, in an exemplary embodiment of the present disclosure, one or more predetermined conditions for resetting or initializing the accumulated driving times of the power conversion modules may comprise a condition of whether the accumulated driving times for all of the power conversion modules are within a predetermined reference time range. For example, the reference time range may be preset to a range of 1000 to 3000 seconds.

For instance, when the reference time range is preset to a range of 1900 to 2100 seconds, if the accumulated driving time of the first power conversion module 110-1, the second power conversion module 110-2, and the third power conversion module 110-3 reaches 1950 seconds, 2000 seconds, and 2030 seconds, respectively, the controller 120 may the controller 120 may determine that the predetermined condition is satisfied.

Finally, if the predetermined condition is satisfied, the controller 120 initializes or reset the cumulatively computed or accumulated driving times for all of the power conversion modules to a preset initialization number such as zero (Step 160).

If the controller 120 continuously and cumulatively computes the driving times of each of the plurality of power conversion modules 110-1, 110-2, and 110-3, the amount of data increases, and the efficiency of resource use of the controller 120 may decrease. In order to solve this problem, in a situation where one or more predetermined conditions are satisfied, the controller 120 may initialize the cumulatively computed or accumulated driving time for all of the power conversion modules.

If the predetermined condition is not satisfied or if the predetermined condition is satisfied and the cumulatively computed or accumulated driving time for each of the power conversion modules is initialized, the controller 120 may return to Step 110 of computing input power. That is, the power conversion method according to an embodiment of the present disclosure may be recursively or repeatedly performed.

Meanwhile, the present disclosure provides a non-transitory computer readable storage medium in which a program including at least one instruction for performing a power conversion method according to an embodiment of the present disclosure is stored. In this case, the instruction may include not only machine code generated by a compiler but also high-level language code executable by a computer.

The recording medium may include a hardware device configured to store and perform program instructions such as a magnetic medium such as a hard disk, a floppy disk, and a magnetic tape, an optical medium such as a compact disk read only memory (CD-ROM), a digital video disk (DVD), a magneto-optical medium such as a floptical disk, a read-only memory (ROM), a random access memory (RAM), and a flash memory.

According to the above configuration, the power conversion apparatus and method according to some embodiments of the present disclosure, and the non-transitory computer-readable storage medium in which a program for performing the method is stored may improve lifespan and long-term reliability by uniformly accumulating driving time for each of the plurality of power conversion modules while minimizing switching loss of the plurality of power conversion modules.

In addition, the power conversion apparatus and method according to certain embodiments of the present disclosure, and the non-transitory computer-readable storage medium in which a program for performing the method is stored may efficiently maintain the load of a controller by cumulatively computing the driving time for each of the plurality of power conversion modules and initializing the accumulated driving time for each of the plurality of power conversion modules in a predetermined condition.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A power conversion apparatus for converting input power input from a first power source and providing the converted input power to a second power source, the power conversion apparatus comprising:

a plurality of power converters connected in parallel with each other between the first power source and the second power source, each of the plurality of power converters configured to convert the input power input from the first power source; and a controller configured to control the plurality of power converters, wherein the controller is configured to selectively drive at least one of the plurality of power converters depending on a ratio of the input power input from the first power source to maximum available input power capable of being input from the first power source, wherein the controller is configured to, if one or some, not all, of the plurality of power converters are required to be selectively driven, drive one or more power converters having a lowest accumulated driving time among the plurality of power converters, and wherein the controller is configured to:

accumulate a driving time of each of the plurality of power converters, and if the accumulated driving time of each of the plurality of power converters satisfies one or more predetermined conditions, initialize the accumulated driving time for each of the plurality of power converters.

2. The power conversion apparatus of claim 1, wherein:

identifiers are assigned to the plurality of power converters, respectively, and the controller is configured to, if two or more of the plurality of power converters have the lowest accumulated driving time and a number of the two or more of the plurality of power converters having the lowest accumulated driving time is greater than a number of the power converters required to be selectively driven, select one or more power converters corresponding to the number of the power converters required to be selectively driven among the two or more of the plurality of power converters having the lowest accumulated driving time based on an order of the identifiers assigned to the plurality of power converters and drive the selected one or more power converters.

3. The power conversion apparatus according to claim 1, wherein the controller is configured to compute the input power based on a command related to an output voltage and/or an output current of the first power source.

4. The power conversion apparatus of claim 1, wherein each of the plurality of power converters is configured to be capable of converting 1/n of the maximum available input power capable of being input from the first power source, where n is a number of the plurality of power converters comprised in the power conversion apparatus (n is a natural number greater than or equal to two).

5. The power conversion apparatus of claim 1, wherein the one or more predetermined conditions for initializing the accumulated driving time for each of the plurality of power converters comprise a condition in which the accumulated driving time for all of the plurality of power converters reaches a predetermined reference time.

6. The power conversion apparatus of claim 5, wherein the predetermined reference time is preset to a specific time between 1000 and 3000 seconds.

7. The power conversion apparatus of claim 1, wherein the one or more predetermined conditions for initializing the accumulated driving time for each of the plurality of power converters comprise a condition in which the accumulated driving time for all of the plurality of power converters is within a predetermined reference time range.

8. The power conversion apparatus of claim 7, wherein the predetermined reference time range is preset to a range of 1000 to 3000 seconds.

9. A power conversion apparatus for converting input power input from a first power source and providing the converted input power to a second power source, the power conversion apparatus comprising:

a plurality of power converters connected in parallel with each other between the first power source and the second power source, each of the plurality of power converters configured to convert the input power input from the first power source; and a controller configured to control the plurality of power converters, wherein the controller is configured to selectively drive at least one of the plurality of power converters depending on a ratio of the input power input from the first power source to maximum available input power capable of being input from the first power source, wherein the controller is configured to, if one or some, not all, of the plurality of power converters are required to be selectively driven, drive one or more power converters having a lowest accumulated driving time among the plurality of power converters, and wherein the controller is configured to, if two or more of the plurality of power converters have the lowest accumulated driving time and a number of the two or more of the plurality of power converters having the lowest accumulated driving time is greater than a number of the power converters required to be selectively driven, randomly select one or more power converters corresponding to the number of the power converters required to be selectively driven among the two or more of the plurality of power converters having the lowest accumulated driving time.

10. A power conversion method for converting input power input from a first power source and providing the converted input power to a second power source, the power conversion method comprising:

computing, by a controller, the input power input from the first power source;

determining, by the controller, a number of one or more power converters required to be selectively driven among a plurality of power converters connected in parallel with each other between the first power source and the second power source, wherein each of the plurality of power converters is configured to convert the input power and the controller is configured to selectively drive at least one of the plurality of the power converters depending on a ratio of the input power input from the first power source to a maximum available input power capable of being input from the first power source;

driving, by the controller, the one or more power converters among the plurality of power converters according to the determined number of one or more power converters;

accumulating, by the controller, a driving time of each of the plurality of power converters; and if one or more predetermined conditions are satisfied, initializing, by the controller, the accumulated driving time for each of the power converters, wherein the driving of the one or more power converters comprises, if one or some, not all, of the plurality of power converters are required to be selectively driven, driving one or more power converters having a lowest accumulated driving time among the plurality of power converters.

11. The power conversion method of claim 10, wherein the driving of the one or more power converters comprises, if two or more of the plurality of power converters have the lowest accumulated driving time and a number of the two or more of the plurality of power converters having the lowest accumulated driving time is greater than the determined number of one or more power converters required to be selectively driven, randomly selecting one or more power converters corresponding to the determined number of the power converters required to be selectively driven among the two or more of the plurality of power converters having the lowest accumulated driving time.

12. The power conversion method of claim 10, wherein:

identifiers are assigned to the plurality of power converters, respectively, and the driving of the one or more power converters comprises, if two or more of the plurality of power converters have the lowest accumulated driving time and a number of the two or more of the plurality of power converters having the lowest accumulated driving time is greater than the determined number of one or more power converters required to be selectively driven, selecting one or more power converters corresponding to the determined number of one or more power converters required to be selectively driven among the two or more of the plurality of power converters having the lowest accumulated driving time based on an order of the identifiers assigned to the plurality of power converters and drive the selected one or more power converters.

13. The power conversion method of claim 10, wherein the computing of the input power comprises computing the input power based on a command related to an output voltage and/or an output current of the first power source.

14. The power conversion method of claim 10, wherein each of the plurality of power converters is configured to be capable of converting 1/n of the maximum available input power capable of being input from the first power source, where n is a number of the plurality of power converters comprised in the power conversion apparatus (n is a natural number greater than or equal to two).

15. The power conversion method of claim 10, wherein the one or more predetermined conditions for initializing the accumulated driving time for each of the plurality of power converters comprise a condition in which the accumulated driving time for all of the power converters reaches a predetermined reference time.

16. The power conversion method of claim 10, wherein the one or more predetermined conditions for initializing the accumulated driving time for each of the plurality of power converters comprise a condition in which the accumulated driving time for all of the power converters is within a predetermined reference time range.

17. A non-transitory computer readable storage medium in which a program including at least one instruction for performing the power conversion method of claim 10 is stored.

* * * * *